United States Patent
Bak

(10) Patent No.: US 11,339,003 B2
(45) Date of Patent: May 24, 2022

(54) TRANSFER APPARATUS AND TRANSFER METHOD

(71) Applicant: SEMES CO., LTD., Cheonan-si (KR)

(72) Inventor: Hyeong Jin Bak, Hwaseong-si (KR)

(73) Assignee: SEMES CO., LTD., Cheonan-si (KR)

( * ) Notice: Subject to any disclaimer, the term of this patent is extended or adjusted under 35 U.S.C. 154(b) by 0 days.

(21) Appl. No.: 17/127,220

(22) Filed: Dec. 18, 2020

(65) Prior Publication Data

US 2021/0198047 A1    Jul. 1, 2021

(30) Foreign Application Priority Data

Dec. 30, 2019  (KR) .................. 10-2019-0177699

(51) Int. Cl.
  *B65G 37/00*  (2006.01)
  *B65G 47/64*  (2006.01)
  *B65G 43/02*  (2006.01)
  *B65G 47/53*  (2006.01)

(52) U.S. Cl.
  CPC ........... *B65G 37/005* (2013.01); *B65G 43/02* (2013.01); *B65G 47/53* (2013.01); *B65G 47/644* (2013.01); *B65G 2203/0291* (2013.01); *B65G 2207/18* (2013.01)

(58) Field of Classification Search
  CPC ...... B65G 37/005; B65G 43/02; B65G 47/53; B65G 47/644; B65G 43/08; B65G 43/10; B65G 2207/18; B65G 2203/0291
  USPC ..................................................... 198/461.1
  See application file for complete search history.

(56) References Cited

U.S. PATENT DOCUMENTS

| | | | | |
|---|---|---|---|---|
| 5,711,410 A * | 1/1998 | Cai | .................. | B65G 43/08 198/460.1 |
| 6,763,931 B1 * | 7/2004 | Brehm | .................. | B65G 43/10 198/460.1 |
| 7,016,768 B2 * | 3/2006 | Grafer | .................. | B65G 43/10 198/459.8 |
| 7,793,772 B2 * | 9/2010 | Schafer | .................. | B65G 47/261 198/460.1 |
| 7,909,750 B2 * | 3/2011 | Howell | .................. | B65H 5/16 493/213 |

(Continued)

FOREIGN PATENT DOCUMENTS

| | | | | |
|---|---|---|---|---|
| CN | 103025632 | * | 3/2013 | ............. B65G 43/08 |
| EP | 383615 | * | 8/1990 | ............. B65G 47/31 |

(Continued)

OTHER PUBLICATIONS

Korean Office Action with English translation for Korean Patent Application No. 10-2019-0177699, dated Apr. 26, 2021.

*Primary Examiner* — James R Bidwell
(74) *Attorney, Agent, or Firm* — Kile Park Reed & Houtteman PLLC

(57) ABSTRACT

Apparatus and method for transferring an object are disclosed. The apparatus includes a transfer track comprising a plurality of conveyors for transferring an object, an upper scheduler creating a transfer path for transferring the object and creating transfer information for controlling operations of conveyors constituting the transfer path, and a plurality of lower schedulers each receiving the transfer information from the upper scheduler and each controlling the operations of the conveyors based on the transfer information.

10 Claims, 2 Drawing Sheets

(56) References Cited

U.S. PATENT DOCUMENTS

| | | | | | |
|---|---|---|---|---|---|
| 2009/0114508 | A1* | 5/2009 | Hara | ................... | B65G 43/08 |
| | | | | | 198/461.1 |
| 2012/0175225 | A1* | 7/2012 | Breen | ................... | B65G 43/10 |
| | | | | | 198/571 |
| 2012/0290126 | A1* | 11/2012 | Combs | ................... | B65G 43/00 |
| | | | | | 700/230 |

FOREIGN PATENT DOCUMENTS

| | | | | |
|---|---|---|---|---|
| EP | 3173887 | * | 3/2016 | ............ B65G 54/02 |
| JP | 2008-150205 | | 7/2008 | |
| KR | 10-1010718 | | 1/2011 | |
| KR | 10-1440569 | | 9/2014 | |
| KR | 10-2018-0132587 | | 12/2018 | |

* cited by examiner

TRANSFER APPARATUS AND TRANSFER METHOD

CROSS-REFERENCE TO RELATED APPLICATION

This application claims the priority benefit of Korean Patent Application No. 10-2019-0177699, filed on Dec. 30, 2019, and all the benefits accruing therefrom under 35 U.S.C. § 119, the contents of which are incorporated by reference in their entirety.

TECHNICAL FIELD

The present disclosure relates to a transfer apparatus and a transfer method. More specifically, the present disclosure relates to a transfer apparatus and a transfer method used to transfer an object in a manufacturing process of semiconductor devices or display devices.

BACKGROUND

Generally, apparatuses for performing manufacturing processes such as deposition, exposure, etching, cleaning, etc. may be arranged in a plurality of rows and columns in a clean room for manufacturing semiconductor devices or display devices. In addition, material transfer apparatuses for supplying materials such as semiconductor wafers or display substrates to the manufacturing apparatuses may be disposed in the clean room.

For example, an overhead hoist transport (OHT) apparatus, a rail guided vehicle (RGV) apparatus, an automatic guided vehicle (AGV) apparatus, a transfer apparatus including a plurality of conveyors, etc. may be disposed in the clean room. In particularly, the transfer apparatus may be configured by connecting a plurality of conveyors for transferring objects between the manufacturing apparatuses, and the operations of the conveyors may be controlled by a control unit connected to the conveyors.

SUMMARY

The embodiments of the present invention provide a transfer apparatus and a transfer method capable of more efficiently controlling operations of conveyors for transferring objects.

In accordance with an aspect of the present invention, a transfer apparatus may include a transfer track comprising a plurality of conveyors for transferring an object, an upper scheduler creating a transfer path for transferring the object and creating transfer information for controlling operations of conveyors constituting the transfer path, and a plurality of lower schedulers each receiving the transfer information from the upper scheduler and each controlling the operations of the conveyors based on the transfer information.

In accordance with some embodiments of the present invention, the transfer information provided to each of the lower schedulers may include speed information of a predetermined number of upstream conveyors based on a corresponding conveyor.

In accordance with some embodiments of the present invention, the transfer information provided to each of the lower schedulers may include location information of the object.

In accordance with some embodiments of the present invention, the transfer information provided to each of the lower schedulers may include speed information of a conveyor positioned directly behind a corresponding conveyor.

In accordance with some embodiments of the present invention, the transfer information provided to each of the lower schedulers may include information on whether or not a predetermined number of downstream conveyors based on a corresponding conveyor normally operate.

In accordance with some embodiments of the present invention, the transfer information provided to each of the lower schedulers may include speed information of a conveyor positioned directly in front of a corresponding conveyor, and the each of the lower schedulers may control a speed of the corresponding conveyor to be equal to a speed of the conveyor positioned directly in front of the corresponding conveyor.

In accordance with some embodiments of the present invention, each of the conveyors may include first sensors for detecting the object on both end portions of the each of the conveyors, and a second sensor for detecting the object on a central portion of the each of the conveyors.

In accordance with some embodiments of the present invention, each of the conveyors may include an obstacle sensor for detecting whether or not an obstacle exists above the each of the conveyors.

In accordance with some embodiments of the present invention, when the obstacle is detected above any one of the conveyors, a lower scheduler corresponding to the conveyor where the obstacle is detected may transmit an obstacle detection signal to the upper scheduler, the upper scheduler may transmit the obstacle detection signal to lower schedulers corresponding to upstream conveyors positioned in front of the conveyor where the obstacle is detected, and the lower schedulers corresponding to the upstream conveyors may control operations of the upstream conveyors so that the object is stopped in front of the conveyor where the obstacle is detected.

In accordance with some embodiments of the present invention, the transfer track may include a first transfer track and a second transfer track intersecting each other, and a conveyor positioned at an intersection point of the first transfer track and the second transfer track may be configured to be rotatable.

In accordance with some embodiments of the present invention, when a first object and a second object moving toward the intersection point are respectively present on the first transfer track and the second transfer track, the upper scheduler may determine a transfer order of the first object and the second object in order to prevent a collision between the first object and the second object at the intersection point.

In accordance with another aspect of the present invention, a transfer method may include creating a transfer path for transferring an object on a transfer track comprising a plurality of conveyors connected to each other, creating transfer information for controlling operations of conveyors constituting the transfer path, and controlling the operations of each of the conveyors based on the transfer information to transfer the object.

In accordance with some embodiments of the present invention, the transfer information may be updated in real time according to a location of the object, a speed of the each of the conveyors constituting the transfer path, whether or not the conveyors normally operate, and whether or not an obstacle exists around the conveyors.

In accordance with some embodiments of the present invention, the transfer method may further include providing the transfer information to lower schedulers for controlling the operations of the each of the conveyors.

In accordance with some embodiments of the present invention, the transfer information provided to each of the lower schedulers may include speed information of a predetermined number of upstream conveyors based on a corresponding conveyor.

In accordance with some embodiments of the present invention, the transfer information provided to each of the lower schedulers may include location information of the object.

In accordance with some embodiments of the present invention, the transfer information provided to each of the lower schedulers may include speed information of a conveyor positioned directly behind a corresponding conveyor.

In accordance with some embodiments of the present invention, the transfer information provided to each of the lower schedulers may include information on whether or not a predetermined number of downstream conveyors based on a corresponding conveyor normally operate.

In accordance with some embodiments of the present invention, the transfer information provided to each of the lower schedulers may include speed information of a conveyor positioned directly in front of a corresponding conveyor, and the each of the lower schedulers may control a speed of the corresponding conveyor to be equal to a speed of the conveyor positioned directly in front of the corresponding conveyor.

In accordance with some embodiments of the present invention, the transfer information provided to each of the lower schedulers may include information on whether or not an obstacle exists above the each of the conveyors.

The above summary of the invention is not intended to describe each illustrated embodiment or every implementation of the present invention. The detailed description and claims that follow more particularly exemplify these embodiments.

BRIEF DESCRIPTION OF THE DRAWINGS

Embodiments of the present invention can be understood in more detail from the following description taken in conjunction with the accompanying drawings, in which.

Figure 1:
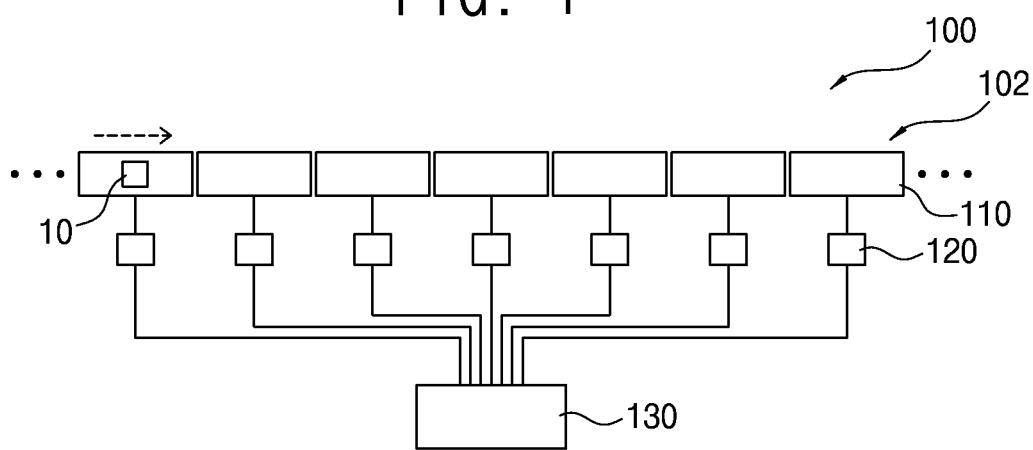
FIG. 1 is a schematic view illustrating a transfer apparatus and a transfer method in accordance with an embodiment of the present invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Hereinafter, embodiments of the present invention are described in more detail with reference to the accompanying drawings. However, the present invention is not limited to the embodiments described below and is implemented in various other forms. Embodiments below are not provided to fully complete the present invention but rather are provided to fully convey the range of the present invention to those skilled in the art.

In the specification, when one component is referred to as being on or connected to another component or layer, it can be directly on or connected to the other component or layer, or an intervening component or layer may also be present. Unlike this, it will be understood that when one component is referred to as directly being on or directly connected to another component or layer, it means that no intervening component is present. Also, though terms like a first, a second, and a third are used to describe various regions and layers in various embodiments of the present invention, the regions and the layers are not limited to these terms.

Terminologies used below are used to merely describe specific embodiments, but do not limit the present invention. Additionally, unless otherwise defined here, all the terms including technical or scientific terms, may have the same meaning that is generally understood by those skilled in the art.

Embodiments of the present invention are described with reference to schematic drawings of ideal embodiments. Accordingly, changes in manufacturing methods and/or allowable errors may be expected from the forms of the drawings. Accordingly, embodiments of the present invention are not described being limited to the specific forms or areas in the drawings, and include the deviations of the forms. The areas may be entirely schematic, and their forms may not describe or depict accurate forms or structures in any given area, and are not intended to limit the scope of the present invention.

FIG. 1 is a schematic view illustrating a transfer apparatus and a transfer method in accordance with an embodiment of the present invention.

Referring to FIG. 1, a transfer apparatus 100 and a transfer method, in accordance with an embodiment of the present invention, may be used to transfer objects 10 in a manufacturing process of semiconductor devices or display devices. For example, the transfer apparatus 100 and the transfer method may be used to transfer containers 10 in which semiconductor wafers are received in the manufacturing process of semiconductor devices.

The transfer apparatus 100 may include a plurality of conveyors 110 constituting a transfer track 102. For example, although not shown in detail, the transfer track 102 may be configured to connect a stocker apparatus for storage of the containers 10 and a plurality of process apparatuses, and an additional transfer robot or an additional conveyor for transferring the objects 10 may be disposed between the stocker apparatus and the transfer apparatus 100 and between the transfer apparatus 100 and the process apparatuses.

The transfer apparatus 100 may include lower schedulers 120 for controlling the operations of each of the conveyors 110 and an upper scheduler 130 for controlling the transfer of the objects 10 as a whole. The upper scheduler 130 may create transfer paths for transferring the objects 10, and may create a plurality of transfer information for controlling the operations of the conveyors 110 constituting the transfer paths. For example, the upper scheduler 130 may create a plurality of transfer paths to transfer the containers 10 from the stocker apparatus to the process apparatuses, from the process apparatuses to the stocker apparatus, or between the process apparatuses. Further, the upper scheduler 130 may determine a transfer order of the containers 10 when the transfer paths overlap or intersect each other.

The lower schedulers 120 may be respectively connected with the conveyors 110 and may respectively control the operations of the conveyors 110 based on the transfer information provided from the upper scheduler 130. For example, the transfer information may include location information of the object 10 to be transferred, speed information of the each conveyor 110, and the like. Further, the transfer information may be updated in real time according to the location of the object 10, the speed of each of the conveyors 110 constituting the transfer path, whether or not the conveyors 110 normally operate, whether or not an obstacle exists around the conveyors 110, and the like.

Figure 2:
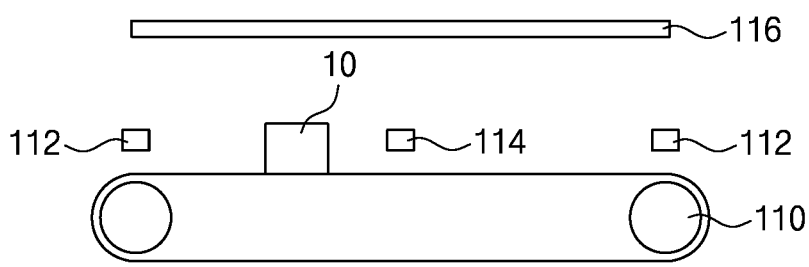
FIG. 2 is a schematic view illustrating a conveyor as shown in FIG. 1.

FIG. 2 is a schematic view illustrating a conveyor as shown in FIG. 1.

Referring to FIG. 2, each of the conveyors 110 may include first sensors 112 for detecting the entry and exit of the object 10 and a second sensor 114 for acquiring the location information of the object 10. For example, the each of the conveyors 110 may include first sensors 112 for detecting the object 10 on both end portions of the each of the conveyors 110 and a second sensor 114 for detecting the object 10 on a central portion of the each of the conveyors 110.

Optical sensors or infrared sensors may be used as the first and second sensors 112 and 114, and the position of the object 10 may be detected according to signals from the first and second sensors 112 and 114. The lower schedulers 120 may detect the position of the object 10 according to the signals from the first and second sensors 112 and 114. Further, the location information acquired as described above may be transmitted to the upper scheduler 130 and may also be transmitted to lower schedulers 120 requiring the location information of the object 10 from the upper scheduler 130.

Each of the conveyors 110 may include an obstacle sensor 116 for detecting an obstacle around the conveyors 110. For example, each of the conveyors 110 may include an obstacle sensor 116 for detecting whether or not an obstacle exists above the each of the conveyors. When an obstacle is detected during the transfer of the object 10, in order to prevent collision with the obstacle, the lower schedulers 120 may control the operations of the conveyors 110 so that the object 10 is stopped on a conveyor 110 (hereinafter referred to as "directly front conveyor") positioned directly in front of a conveyor 110 where the obstacle is detected.

Figure 3:
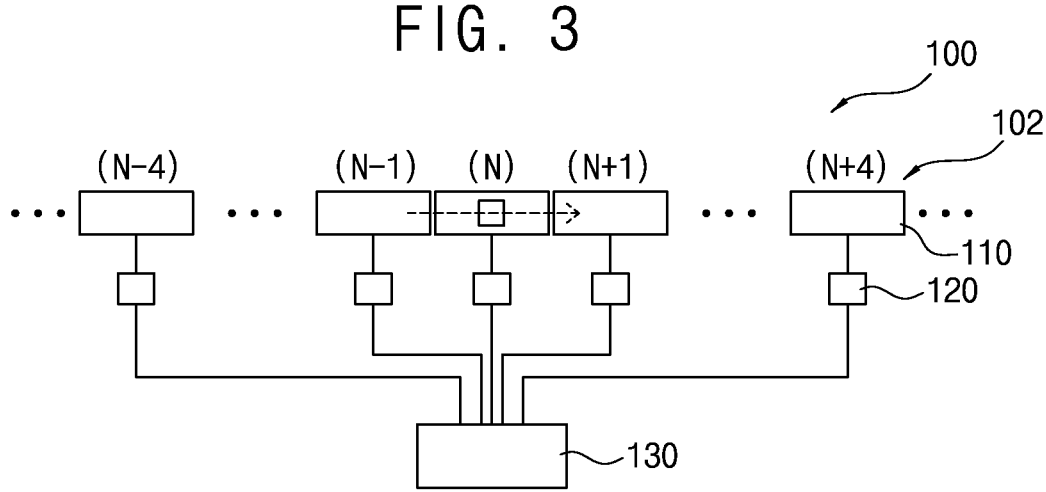
FIG. 3 is a schematic view illustrating transfer information provided to lower schedulers as shown in FIG. 1.

FIG. 3 is a schematic view illustrating transfer information provided to lower schedulers as shown in FIG. 1.

Referring to FIG. 3, the transfer information provided to each of the lower schedulers 120 speed information of the predetermined number of upstream conveyors 110 based on the corresponding conveyor 110. For example, the speed information from an $N-4^{th}$ conveyor 110 to an $N-1^{th}$ conveyor 110 may be provided to an $N^{th}$ lower scheduler 120 for controlling an operation of an $N^{th}$ conveyor 110. Further, the speed information of an $N+1^{th}$ conveyor 110 (hereinafter referred to as "directly behind conveyor") positioned directly behind the $N^{th}$ conveyor 110 may be provided to the $N^{th}$ lower scheduler 120.

The transfer path may include an acceleration section, a constant speed section, and a deceleration section. When the $N^{th}$ conveyor 110 is included in the constant speed section, the speeds of the $N-1^{th}$ conveyor 110 and the $N+1^{th}$ conveyor 110 may be the same, and the $N^{th}$ convey 110 may be controlled at the same speed as the $N-1^{th}$ conveyor and the $N+1^{th}$ conveyor 110. For example, the $N-1^{th}$ conveyor 110 and the $N+1^{th}$ conveyor may be operated at a third speed, for example, a speed of about 1.0 m/s, and the $N^{th}$ lower scheduler 120 may control the $N^{th}$ conveyor 110 at the third speed. At this time, the transfer information may include the location information of the object 10. The $N^{th}$ conveyor 110 may wait in a stopped state until the object 10 reaches a predetermined position, and may be accelerated from the stopped state to the third speed after the object 10 is detected at the predetermined position, for example, the object 10 is detected on the $N-4^{th}$ conveyor 110.

When the $N^{th}$ conveyor 110 is included in the acceleration section, the speed of the $N+1^{th}$ conveyor 110 may be higher than the speed of the $N-1^{th}$ conveyor 110. For example, a first conveyor 110 in a starting position may accelerate from a standstill to a first speed, for example, a speed of about 0.2 m/s, and may deliver the object 10 to a second conveyor 110 at the first speed. The second conveyor 110 may receive the object 10 at the first speed, accelerate to a second speed, for example, a speed of about 0.6 m/s, and may then deliver the object 10 to a third conveyor 110 at the second speed. The third conveyor 110 may receive the object 10 at the second speed, accelerate to a third speed, for example, a speed of about 1.0 m/s, and then deliver the object 10 to a fourth conveyor 110 at the third speed. That is, the $N^{th}$ conveyor 110 may be operated at the same speed as the $N-1^{th}$ conveyor to receive the object 10 from the $N-1^{th}$ conveyor 110, and may then be accelerated at the same speed as the $N+1^{th}$ conveyor 110 to deliver the object 10 to the $N+1^{th}$ conveyor 110. On the contrary to the above, when the $N^{th}$ conveyor 110 is included in the deceleration section, the operations of the conveyors 110 may be controlled contrary to the acceleration section.

The transfer information provided to each of the lower schedulers 120 may include information on whether or not the predetermined number of downstream conveyors based on the corresponding conveyor normally operate. For example, information on whether or not the conveyors 110 from $N+1^{th}$ to $N+4^{th}$ operate normally may be provided to the $N^{th}$ conveyor 110. For example, when the $N+4^{th}$ conveyor 110 is in an inoperative state, deceleration may start from the $N^{th}$ convey 110, and movement of the object 10 may be stopped on at least an $N+3^{th}$ conveyor 110. When an abnormal operation occurs in one of the conveyors 110, the upper scheduler 130 may provide the information on the abnormal operation state to the lower schedulers 120 for controlling the upstream conveyors 110 so that the object 10 is stopped in front of the conveyor 110 in which the operation abnormality has occurred.

The transfer information provided to each of the lower schedulers 120 may include information on whether or not an obstacle exists above the conveyors 110. For example, when an obstacle is detected above any one of the conveyors 110, a lower scheduler 120 corresponding to the conveyor 110 where the obstacle is detected transmits an obstacle detection signal to the upper scheduler 130. The upper scheduler 130 may transmit the obstacle detection signal to lower schedulers 120 corresponding to upstream conveyors 110 positioned in front of the conveyor 110 where the obstacle is detected. The lower schedulers 120 corresponding to the upstream conveyors 110 may control operations of the upstream conveyors 110 so that the object is stopped in front of the conveyor 110 where the obstacle is detected. For example, when an obstacle is detected by the obstacle detection sensor 116 of the $N+1^{th}$ conveyor 110, the lower scheduler 120 connected to the $N^{th}$ conveyor 110 may stop the $N^{th}$ conveyor 110 in order to prevent collision between the object 10 and the obstacle.

Figure 4:
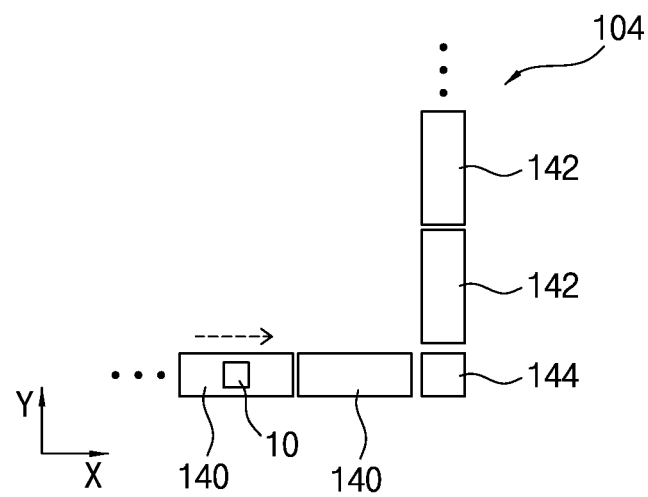
FIG. 4 is a schematic view illustrating another example of a transfer track as shown in FIG. 1.

FIG. 4 is a schematic view illustrating another example of a transfer track as shown in FIG. 1.

Referring to FIG. 4, a transfer track 104 may include first conveyors 140 connected with each other in a first direction, for example, in an X-axis direction, and second conveyors 142 connected with each other in a second direction, for example, in a Y-axis direction. Further, the transfer track 104 may include a third conveyor 144 for connecting the first conveyors 140 and the second conveyors 142, and the third conveyor 144 may be configured to be rotatable in order to change the moving direction of the object 10. For example, when the transfer path of the object 10 includes the first and second conveyors 140 and 142, the transfer of the object 10 may be controlled to move in the first direction and stop on the third conveyor 144, and may be controlled to start and move in the second direction after rotation of the third conveyor 144.

Figure 5:
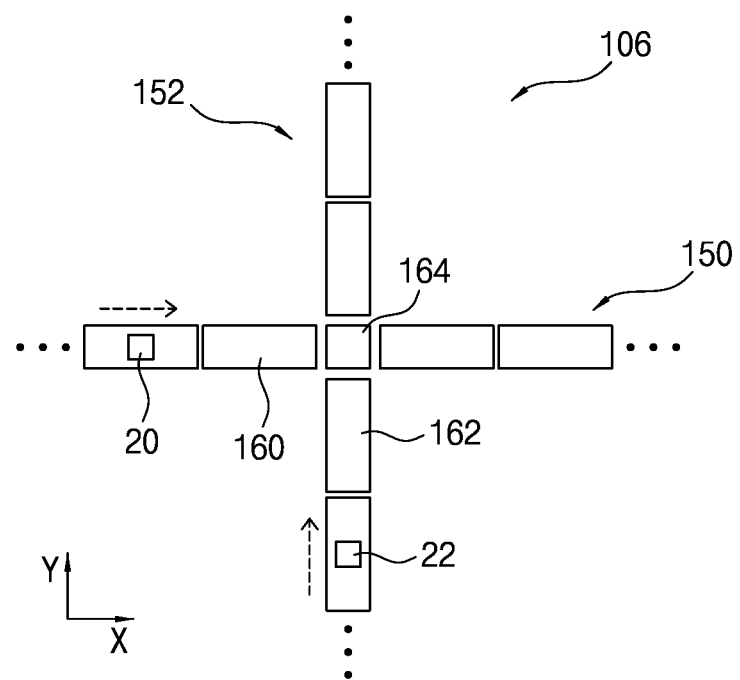
FIG. 5 is a schematic view illustrating still another example of a transfer track as shown in FIG. 1.

FIG. 5 is a schematic view illustrating still another example of a transfer track as shown in FIG. 1.

Referring to FIG. 5, a transfer track 106 may include a first transfer track 150 and a second transfer track 152 intersecting each other. For example, the first transfer track 150 may include first conveyors 160 connected with each other, and the second transfer track 152 may include second conveyors 162 connected with each other. A third conveyor 164 configured to be rotatable may be disposed at an intersection point of the first transfer track 150 and the second transfer track 152.

Particularly, when a first object 20 and a second object 22 moving toward the intersection point are respectively present on the first transfer track 150 and the second transfer track 152, the upper scheduler 130 may determine a transfer order of the first object 20 and the second object 22 in order to prevent a collision between the first object 20 and the second object 22 at the intersection point. For example, the upper scheduler 130 may provide transfer information for controlling operations of the first conveyors 160 and the third conveyor 164 to lower schedulers 120 connected to the first conveyors 160 and the third conveyor 164 so that the first object 20 passes through the third conveyor 164 before the second object 22. Further, the upper scheduler 130 may provide transfer information for controlling operations of the second conveyors 162 to lower schedulers 120 connected to the second conveyors 162 so that the second object 22 is stopped directly before the third conveyor 164. After the first object 20 passes through the third conveyor 164, the third conveyor 164 may be rotated to transfer the second object 22, and the second object 22 may then be transferred by the third conveyor 164 and the second conveyors 162.

According to the embodiments of the present invention, the upper scheduler 130 may create the transfer path for transferring the object 10 and create transfer information for controlling operations of the conveyors 110, and the lower schedulers 120 may control the operations of each of the conveyors 110 based on the transfer information. Thus, the transfer of the object 10 may be performed more efficiently in comparison with the prior art controlling operations of a plurality of conveyors using a single controller. Particularly, the transfer paths of the object 10 may be set in more various ways, and even when a layout of the transport track is changed, it is not necessary to change and apply a control software unlike the prior art, and accordingly, the transfer efficiency of the transfer apparatus 100 may be greatly improved.

Although the example embodiments of the present invention have been described with reference to the specific embodiments, they are not limited thereto. Therefore, it will be readily understood by those skilled in the art that various modifications and changes can be made thereto without departing from the spirit and scope of the appended claims.

The invention claimed is:

1. A transfer apparatus comprising:
    a transfer track comprising a plurality of conveyors for transferring an object;
    an upper scheduler creating a transfer path for transferring the object and creating transfer information for controlling operations of conveyors constituting the transfer path; and
    a plurality of lower schedulers each receiving the transfer information from the upper scheduler and each controlling the operations of the conveyors based on the transfer information,
    wherein each of the conveyors comprises;
        first sensors for detecting the object on both end portions of the each of the conveyors; and
        a second sensor for detecting the object on a central portion of the each of the conveyors.

2. The transfer apparatus of claim 1, wherein the transfer information provided to each of the lower schedulers comprises speed information of a predetermined number of upstream conveyors based on a corresponding conveyor.

3. The transfer apparatus of claim 1, wherein the transfer information provided to each of the lower schedulers comprises location information of the object.

4. The transfer apparatus of claim 1, wherein the transfer information provided to each of the lower schedulers comprises speed information of a conveyor positioned directly behind a corresponding conveyor.

5. The transfer apparatus of claim 1, wherein the transfer information provided to each of the lower schedulers comprises information on whether or not a predetermined number of downstream conveyors based on a corresponding conveyor normally operate.

6. The transfer apparatus of claim 1, wherein the transfer information provided to each of the lower schedulers comprises speed information of a conveyor positioned directly in front of a corresponding conveyor, and
    the each of the lower schedulers controls a speed of the corresponding conveyor to be equal to a speed of the conveyor positioned directly in front of the corresponding conveyor.

7. The transfer apparatus of claim 1, wherein each of the conveyors comprises:
    an obstacle sensor for detecting whether or not an obstacle exists above the each of the conveyors.

8. The transfer apparatus of claim 7, wherein when the obstacle is detected above any one of the conveyors, a lower scheduler corresponding to the conveyor where the obstacle is detected transmits an obstacle detection signal to the upper scheduler,
    the upper scheduler transmits the obstacle detection signal to lower schedulers corresponding to upstream conveyors positioned in front of the conveyor where the obstacle is detected, and
    the lower schedulers corresponding to the upstream conveyors control operations of the upstream conveyors so that the object is stopped in front of the conveyor where the obstacle is detected.

9. The transfer apparatus of claim 1, wherein the transfer track comprises a first transfer track and a second transfer track intersecting each other, and
    a conveyor positioned at an intersection point of the first transfer track and the second transfer track is configured to be rotatable.

10. The transfer apparatus of claim 9, wherein when a first object and a second object moving toward the intersection point are respectively present on the first transfer track and the second transfer track, the upper scheduler determines a transfer order of the first object and the second object in order to prevent a collision between the first object and the second object at the intersection point.

\* \* \* \* \*